United States Patent
Dickson

(10) Patent No.: US 10,019,767 B2
(45) Date of Patent: Jul. 10, 2018

(54) COMPUTERIZED SYSTEM AND METHOD FOR REAL ESTATE SEARCHES AND PROCUREMENT

(71) Applicant: BUYER HERO, LLC, Sarasota, FL (US)

(72) Inventor: Mark S. Dickson, Lakewood Ranch, FL (US)

(73) Assignee: BUYER HERO, LLC, Sarasota, FL (US)

(*) Notice: Subject to any disclaimer, the term of this patent is extended or adjusted under 35 U.S.C. 154(b) by 0 days.

(21) Appl. No.: 14/568,243

(22) Filed: Dec. 12, 2014

(65) Prior Publication Data
US 2015/0170301 A1 Jun. 18, 2015

Related U.S. Application Data

(60) Provisional application No. 61/915,632, filed on Dec. 13, 2013, provisional application No. 61/975,054, filed on Apr. 4, 2014.

(51) Int. Cl.
*G06F 7/00* (2006.01)
*G06F 17/30* (2006.01)
*G06Q 50/16* (2012.01)
*G06F 17/00* (2006.01)

(52) U.S. Cl.
CPC ....... *G06Q 50/16* (2013.01); *G06F 17/30699* (2013.01); *G06F 17/30864* (2013.01); *G06F 17/30867* (2013.01)

(58) Field of Classification Search
CPC ......... G06F 17/30864; G06F 17/30867; G06F 17/30699; G06Q 50/16

USPC .......................................... 707/748, 946, 733
See application file for complete search history.

(56) References Cited

U.S. PATENT DOCUMENTS

| | | | |
|---|---|---|---|
| 7,016,866 B1* | 3/2006 | Chin | G06Q 30/0631 705/26.7 |
| 8,024,349 B1* | 9/2011 | Shao et al. | 707/769 |
| 8,095,434 B1* | 1/2012 | Puttick et al. | 705/26.9 |
| 8,583,562 B1 | 11/2013 | McDaniel et al. | |
| 2002/0087389 A1* | 7/2002 | Sklarz et al. | 705/10 |
| 2003/0229649 A1* | 12/2003 | Herrero | 707/104.1 |
| 2006/0167710 A1* | 7/2006 | King et al. | 705/1 |

(Continued)

OTHER PUBLICATIONS

Casamatic, https://www.casamatic.com/ (last accessed Aug. 24, 2016).

*Primary Examiner* — Kannan Shanmugasundaram
(74) *Attorney, Agent, or Firm* — Buchanan Ingersoll & Rooney PC

(57) ABSTRACT

A method for locating real estate having desired attributes includes storing, in a profile database, at least one client profile, the client profile including a client identifier associated with a client and at least two preferences of the client, storing, in a neighborhood database, at least one neighborhood defined by at least one neighborhood attribute other than zip code, receiving, by a receiving unit, one or more properties not currently for sale within the at least one neighborhood, weighting, by a processing unit, the at least two preferences, generating, by the processing unit, a list of one or more properties not currently for sale within the at least one neighborhood having the at least two preferences, and transmitting, by a transmitting unit, the list of one or more properties to the client.

13 Claims, 16 Drawing Sheets

(56) References Cited

U.S. PATENT DOCUMENTS

| | | | |
|---|---|---|---|
| 2010/0145823 A1* | 6/2010 | Callow et al. | 705/27 |
| 2011/0145159 A1* | 6/2011 | Wilson et al. | 705/313 |
| 2012/0330719 A1* | 12/2012 | Malaviya | G06Q 30/02 |
| | | | 705/7.31 |

* cited by examiner

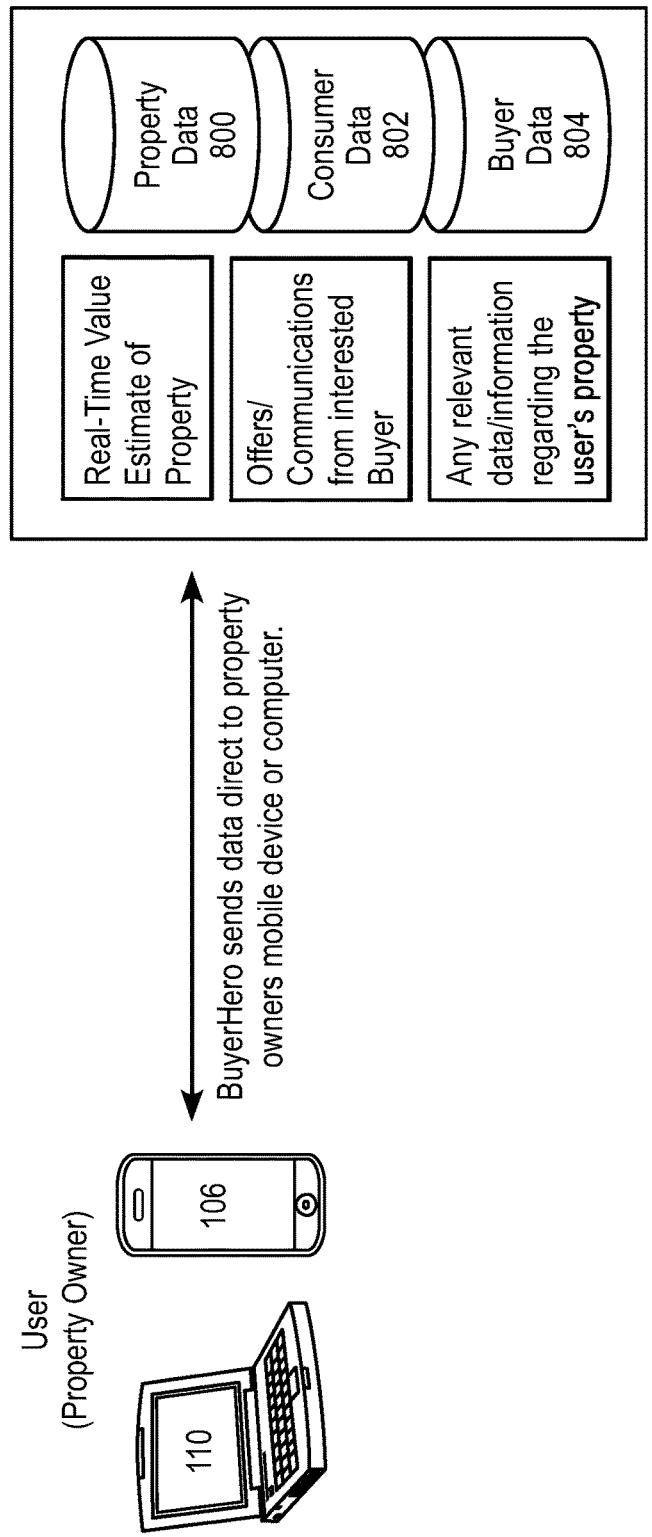

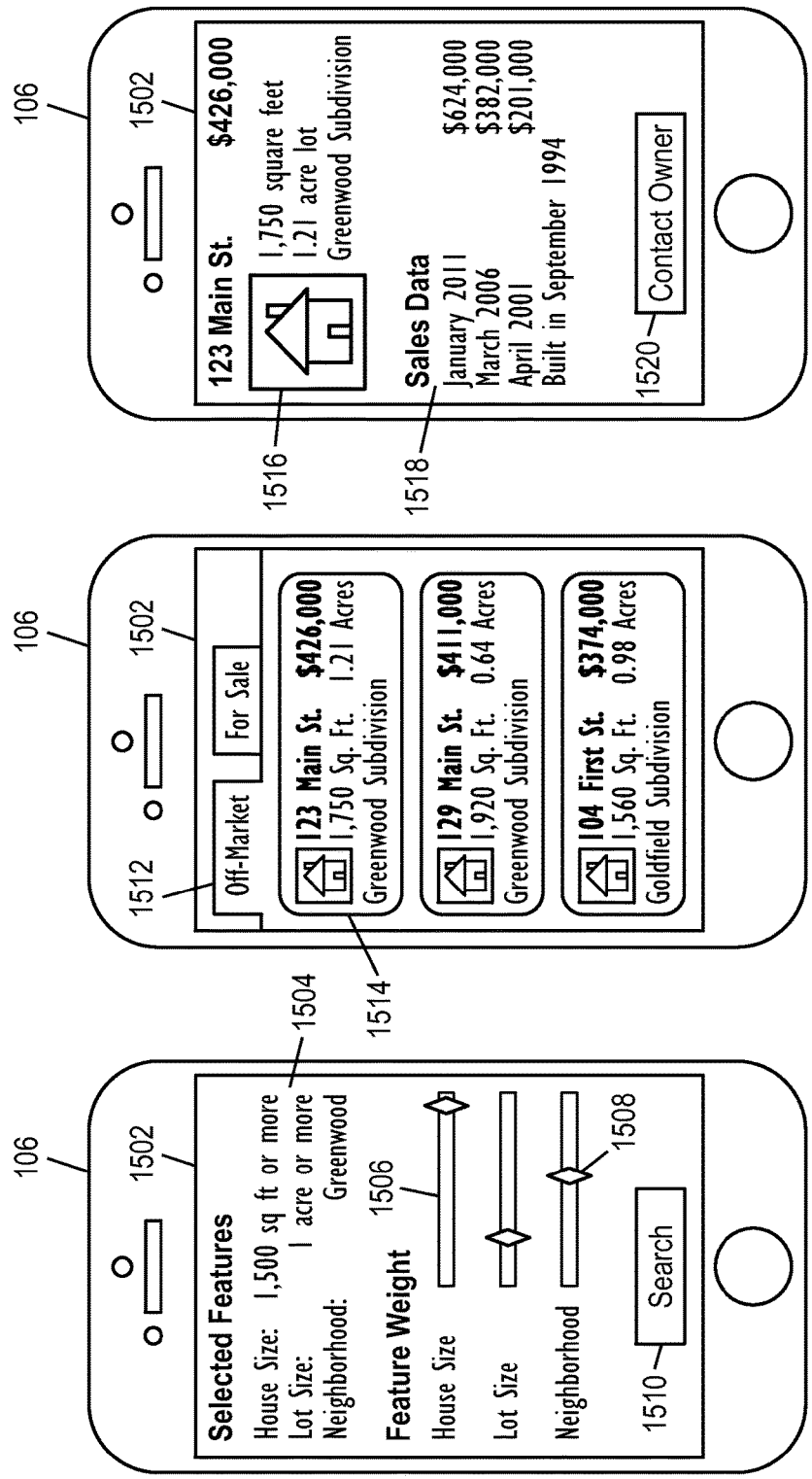

COMPUTERIZED SYSTEM AND METHOD FOR REAL ESTATE SEARCHES AND PROCUREMENT

CROSS REFERENCE TO RELATED APPLICATION

This application claims priority under 35 U.S.C. § 119(e) to U.S. provisional Application No. 61/915,632, filed on Dec. 13, 2013 and U.S. provisional Application No. 61/975,054, filed on Apr. 4, 2014, the entire content of each of which is incorporated herein by reference thereto

FIELD

The present disclosure relates to the facilitating of a system with buyers, real estate agents, and property owners, specifically the facilitating of a system driven by home buyers and real estate agents searching for properties satisfying the client's requirements.

BACKGROUND

An interested real estate buyer or lessor must make a substantial commitment in order to find a potential property. Buyers commonly retain the services of a real estate professional to obtain a reliable listing of available properties. The buyers must identify potential properties. Once a list of potential properties is created, the buyers will typically physically visit the potential properties to identify desired properties. The visits by the buyers are typically performed at the property owner's convenience due to the need for the property owner's privacy. These steps cause the buyer to expend considerable time and resources to find the desired properties, even when the services of a real estate professional are retained. In addition, many desirable properties are not listed for sale though they may be available for sale or lease if interest is expressed to the property owner.

Thus, there is a need for a technical solution to create a system and method that addresses the above described issues.

SUMMARY

The present disclosure provides a description of systems and methods for searching for and locating real estate having desired attributes. The present disclosure also provides a description of systems and methods for directly contacting property owners of properties that are not currently for sale and allowing property owners to review buyer profiles to determine if they wish to sell their property.

A method for locating real estate having desired attributes includes: (a) storing, in a profile database, at least one client profile, the client profile including a client identifier and at least two preferences; (b) storing, in a neighborhood database, at least one neighborhood defined by at least one neighborhood attribute other than zip code; (c) receiving, by a receiving unit, one or more properties not currently for sale within the at least one neighborhood; (d) weighting, by a processing unit, the at least two preferences; (e) generating, by the processing unit, a list of one or more properties for sale within the at least one neighborhood having the at least two preferences; and (f) transmitting, by a transmitting unit, the list of one or more properties to the client.

The method may also include generating, by the processing unit, a valuation of each of the one or more properties for sale included in the list. Moreover, the method may include storing, in a property database, the one or more properties for sale.

In one embodiment, the method includes transmitting, by the transmitting unit, an offer to buy one of the one or more properties for sale to a property owner, and, receiving, by the receiving unit, an acceptance of the offer. The transmitting unit further includes providing, by the transmitting unit, economic data including average list price, average days on the market, median house size and median lot size for the at least one neighborhood to the client.

A system for facilitating an off-market transaction includes: (a) a profile database configured to store at least one client profile, the client profile including a client identifier associated with a client and at least two preferences of the client; (b) a neighborhood database configured to store at least one neighborhood defined by at least one neighborhood attribute other than zip code; (c) a receiving unit configured to receive listings of one or more properties not currently for sale within the neighborhood; (d) a processing unit configured to weight the at least two preferences and generate a list of one or more properties for sale within the neighborhood and having the at least two preferences; and (e) a transmitting unit configured to transmit the list of one or more properties to a client associated with the client profile. The processing unit may also be configured to generate a valuation of the one or more properties The system may also include a property database configured to store listings of properties for sale, and a receiving unit configured to receive an offer to buy one of the one or more properties for sale from the client. The transmitting unit may be configured to transmit the offer to a property owner, and the receiving unit may be configured to receive an acceptance of the offer from the property owner.

The system may also calculate when a homeowner is likely to sell their home based on a number of factors. In one embodiment, the system may also calculate the probability that a homeowner would pursue a transaction.

A method for buying real estate includes: receiving, by a receiving unit, a list of one or more properties; generating, by the processing unit, a list of one or more properties having at least two client preferences; transmitting, by a transmitting unit, the list of one or more properties not currently for sale and having the at least two preferences to the client; contacting, by the transmitting unit, one or more prospective property owner s of the one or more properties; storing, in a profile database, at least one property owner profile, the property owner profile including a property owner identifier; generating, by the processing unit, a list of one or more clients interested in the property owner's property, the list including at least one client profile; and receiving, by the receiving unit, an indication of whether the property owner wishes to sell the property owner's property.

The method may also include transmitting, by the transmitting unit an offer to buy the property owner's property, and receiving, by the receiving unit an acceptance of the offer.

A system for buying real estate includes: a receiving unit configured to receive a list of one or more properties; a processing unit configured to generate a list of one or more properties not currently for sale and having at least two client preferences; a transmitting unit configured to transmit the list of one or more properties having the at least two preferences to a client and contact one or more property owner s of the one or more properties; and a profile database configured to store at least one property owner profile including a property owner identifier and at least one client profile including a client identifier.

BRIEF DESCRIPTION OF THE DRAWING FIGURES

Exemplary embodiments are best understood from the following detailed description when read in conjunction with the accompanying drawings. Included in the drawings are the following figures:

FIG. 14 is a flow diagram illustrating a mobile application for use of the system.

FIGS. 15A, 15B, and 15C are diagrams illustrating a mobile application as described herein.

FIGS. 16A, 16B, 16C, and 16D are diagrams illustrating a mobile application as described herein.

Figure 17:
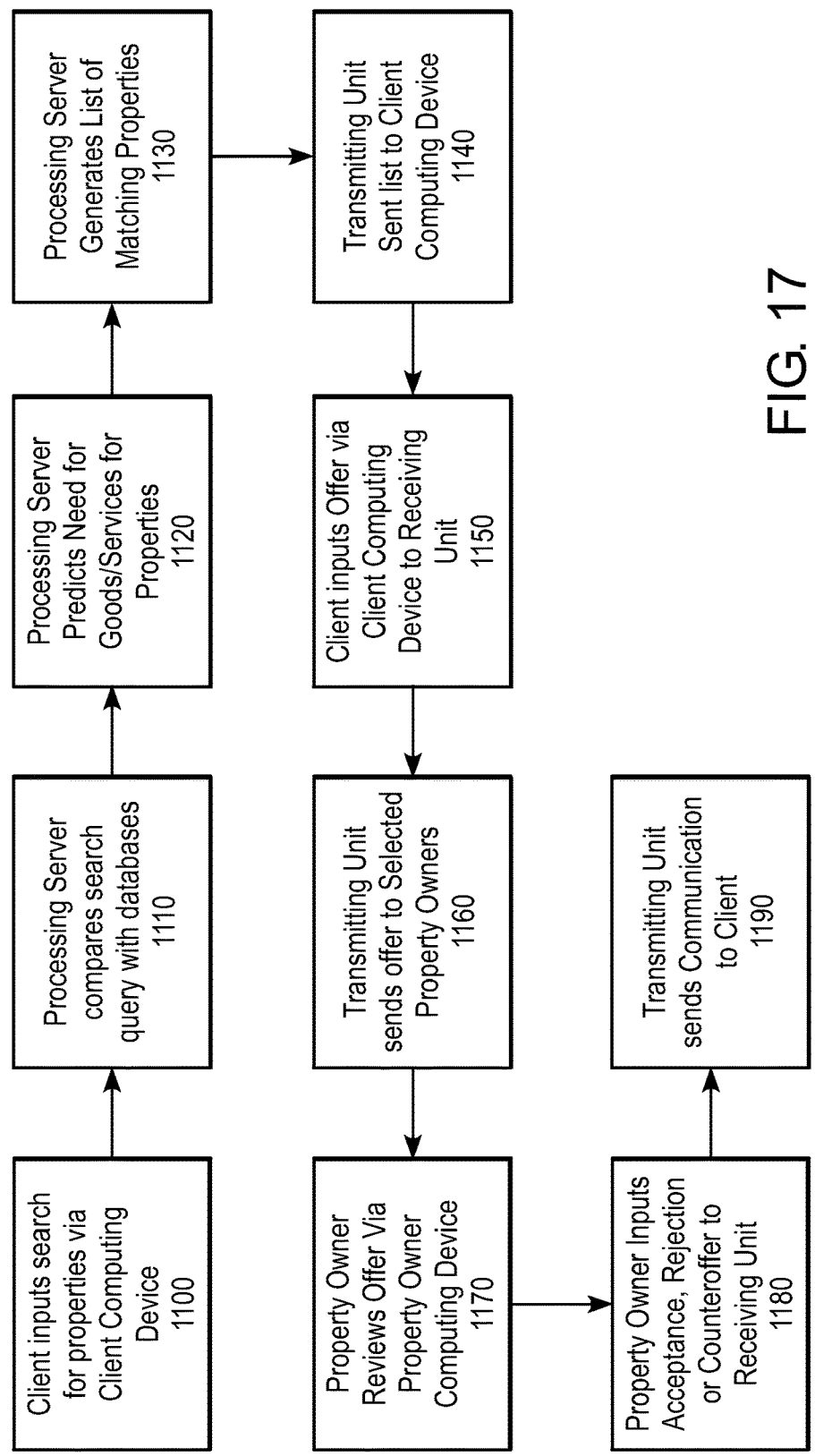

FIG. 17 is a flow diagram illustrating an automated process for marketing home goods and services.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

In the context of the present method and system, a system driven by clients including prospective property buyers (e.g., home buyers and/or real estate agents), lessor's, home service providers, product retailers, and product manufacturers helps direct the clients to desirable properties for purchase or lease, or properties which may be in need of repair or other goods and services based on the property age and other factors.

In order to participate in the system, the client provides the system with key information (described below), the collection of which may be referred to as a client profile that is associated with a client identification code. The system then makes a determination using information from the client profile, databases of property information (described below), and other sources to match the client identification code with the property identification code of properties determined to potentially be desirable to the client. The properties may be for sale or lease, but perhaps more interestingly properties that are not currently for sale or lease including those that the owner of which has expressed no interest in selling or leasing. The system may then facilitate contacting the property owner, including potentially cold contacting one or more property owners that have not expressed an interest in selling or leasing. The system may facilitate the ultimate transaction, in an automated fashion, of transferring ownership of a property as a result of the initial contact, for instance.

Glossary of Terms

Client—A client is a potential property buyer (e.g. homes, rental properties, apartments, apartment buildings, office and retail space, etc.), real estate agent, potential tenant/lessor, or other entity seeking real estate listings having desired characteristics. A plurality of clients would typically exist in the system. A client may also be any home-related service provider, home product retailer, or home product manufacturer.

Client Preferences—Electronic data representing a client's preferences that are determined based on the client's input into the system and represent the client's individualized preferences for a set of attributes for properties the client would find potentially desirable. These may include property attributes defined below.

Client Requirements—Electronic data representing a client's requirements, which represent the client's individualized requirement characteristics for properties, that are required rather than merely desired attributes of a property and/or neighborhood that might be desirable to the client as defined herein.

Client Profile—Electronic data representing a client's profile that includes the client preferences and client requirements, but also may include data from prior property requests, information from the client about the client that is designated for presentation to a property owner (e.g., identifying the client as a prospective home owner, developer, real estate professional, etc. and optionally, credit worthiness, income, wealth, etc.), including information that might help determining or identifying potential properties of interest that may not be designated for sharing with prospective property owners (e.g., prior history of buying, tracked buying habits, reputation score, etc.).

Property Request—A property request is an electronic request form that is completed and submitted by the client for a property in the system. The property request may include a variety of parameters including some of the client preferences, client requirements, and other information from the client profile. The client may select and weight the preferences, requirements, and other information of the property request as needed. For example, a client's profile may indicate he or she prefers a one-bedroom property and give that preference a greater weight, but the client nevertheless wishes to submit a property request for a two-bedroom property and give that preference lesser relative weight. The weights of multiple client preferences may be used to sort results. The client may modify the property request to reflect the client's current or changing preferences. The property request need not completely reflect the client's current client profile. The property request may include as many parameters as are needed to reflect the client's desires. The client may then submit the property request into the system to retrieve desirable properties for consideration.

Administrators—The electronic systems and methods described herein may be managed by one or more administrators who do not act as buyers or property owners in specific transactions of the system, but oversees the functions thereof. The administrator has the ability to search and view the characteristics of the client profiles in the system and the characteristics of the properties in the system. For example, the administrators may search for clients that have registered within the last week, clients that prefer a property with a garage, and clients that prefer a property that cost less than $200,000. The administrators may view the property requirements of clients in the system. The administrators may modify information in the system so that proper operation of the system is facilitated. For example, the administrators may assign or reassign the system determine individual or group of properties a predetermined neighborhood value. This would allow the group of properties to be considered a community, under one possible definition of a neighborhood.

Neighborhood—A geographical location defined by a zip code and at least one desired parameters other than zip code and including a group of properties. A particular neighborhood may be defined using a variety of methods. In one embodiment a neighborhood is determined using information associated with each property. For example, such information could be the conventional or recognized name of the neighborhood in which the property sits. Another way a neighborhood may be defined is by using the mailing address for each property or another location based aspect of the information associated with each property. Thus, a neighborhood could be defined as the properties on a particular street address or a range of street addresses. In another example, neighborhood may be determined by the location of properties relative to another location. For example, a neighborhood may be defined as properties located a predetermined distance from the client's place of work or a particular shopping center, beach or other body of water, airport or park. Yet another neighborhood may be determined using information associated with a location or a facility. For example, a neighborhood may be a school district, a zoning district, a business district or economic zone, or virtually any criteria that assists in demarking a geographic area from adjacent areas by criteria relevant to the clients. In an exemplary embodiment, a neighborhood may be defined using client input. For example, the client may use any of the above criteria in combination, or simply draw a shape or a representation on a map of the properties of an area to define a neighborhood. Additionally, a neighborhood may be a collection of adjacent properties that share or collectively create attributes. For instance, properties that have older or below market value building (e.g., ready for replacement) and a collective size to permit the building of additional buildings under applicable zoning and building regulations may be used to define a neighborhood according to the client's interests. A combination of these may also be employed to define a neighborhood.

Neighborhood Requirements or Preferences—Neighborhood requirements or preferences may be specific to a neighborhood, which is an area with a group of properties defined by a zip and at least one other parameter. The neighborhood requirements are attributes of the neighborhood that must be included in the definition of the neighborhood for a given client, and neighborhood preferences may be those characteristics that the client would prefer, according perhaps to the weighted value. For example, neighborhood attributes may include the proximity of the neighborhood to a body of water or a park, the availability of public transportation, shopping, restaurants, affordability of property insurance, whether the neighborhood is a historic landmark, and the availability and reputation of public institutions including schools and/or crime statistics. Other neighborhood requirements may include the affordability of property insurance, the local crime rate, and if the neighborhood is a historic neighborhood. Neighborhood requirements may be determined using property data and other sources. For example, in one embodiment the location of properties in a neighborhood are correlated with demographics to determine if the neighborhood includes a retirement community, a diverse population, education and/or income levels, as examples. Other neighborhood requirements are not specifically enumerated but are also within the scope of the present disclosure.

Property Owner—An entity owning at least one property, which may or may not be listed for sale or lease. Property owners create or identify the information that provides the attributes of properties in the system, or this information may be obtained from property tax records, property assessments, building records, third parties, comments from other clients or property owners, court and estate records, credit reports, etc. The property owners may be active participants in the system or may be passive participants in the system. The property owners may make an account or use other means to manage the information for properties in the system if desired. The information for properties in the system may also be obtained from other sources such as third party data providers including MLS®, property tax records, or consumer databases. In such situations, the property owners are passive participants in the system. An actively participating property owner may create an account or use other means to actively manage the information in the system. Known techniques facilitating such active participation are known in the art and not enumerated here.

Properties—A plurality of properties exist in the system, with each property in the system having a set of property attributes that characterize the property.

Property Attributes—Property attributes are characteristics specific to an individual property. Property attributes may include the number of bedrooms, bathrooms, and other rooms in a building, the price, the assessed value, the type of property, the size of the building, and the size of the lot. Property attributes may also include data such as pictures or video of the property, links to tax records information, and other information specific to the property. Property attributes may be determined from property data obtained from third party sources. Property attributes may also be determined using property data and other data sources. For example, in one embodiment the address of a property may be correlated with locations of restaurants to determine the property's proximity to restaurants. Other property attributes are not specifically enumerated but are also within the scope of the present disclosure.

System for the Search and Location of Real Estate

Figure 1:
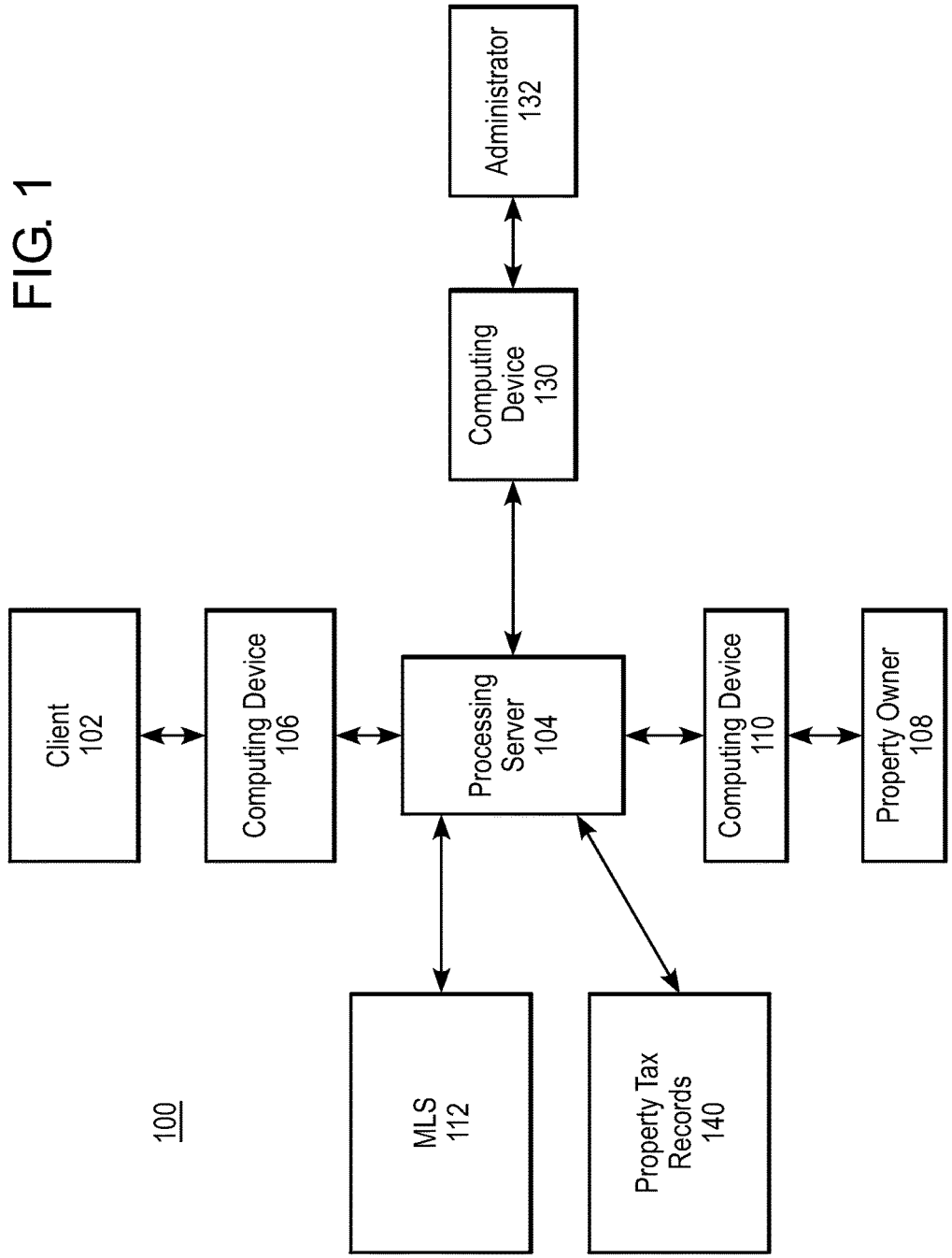
FIG. 1 is a diagram illustrating a system for the search and location of real estate having desirable attributes as described herein.

FIG. 1 illustrates a system 100 for the search and location of real estate properties for sale or lease in accordance with exemplary embodiments.

The system 100 may include a computing device 106 of a client 102. The client 102 may communicate with a processing server 104 via the client computing device 106. The client computing device 106 may be any type of computing device including a desktop or laptop computer, a tablet computer, a notebook computer, a smart phone or other suitable device capable of receiving input from a client 102, processing and displaying information and communicating with the processing server 104.

The system 100 may also include a computing device 110 of a property owner 108. The property owner 108 may communicate with the processing server 104 via the property owner computing device 110, which may be any of the devices listed above and may be a device of the same or different type than the client computing device 106.

The processing server 104 is a computer that is specifically programmed to carry out the method and perform the functionality described herein, which is significantly more than a general purpose computer is capable. It may receive registration information from the client 102 for storage in a profile database 114 (shown in FIG. 2) via the client computing device 106 or through other input device, e.g., orally to an administrator who inputs the information. The client registration information may include a client identifier and at least two preferences.

Figure 2:
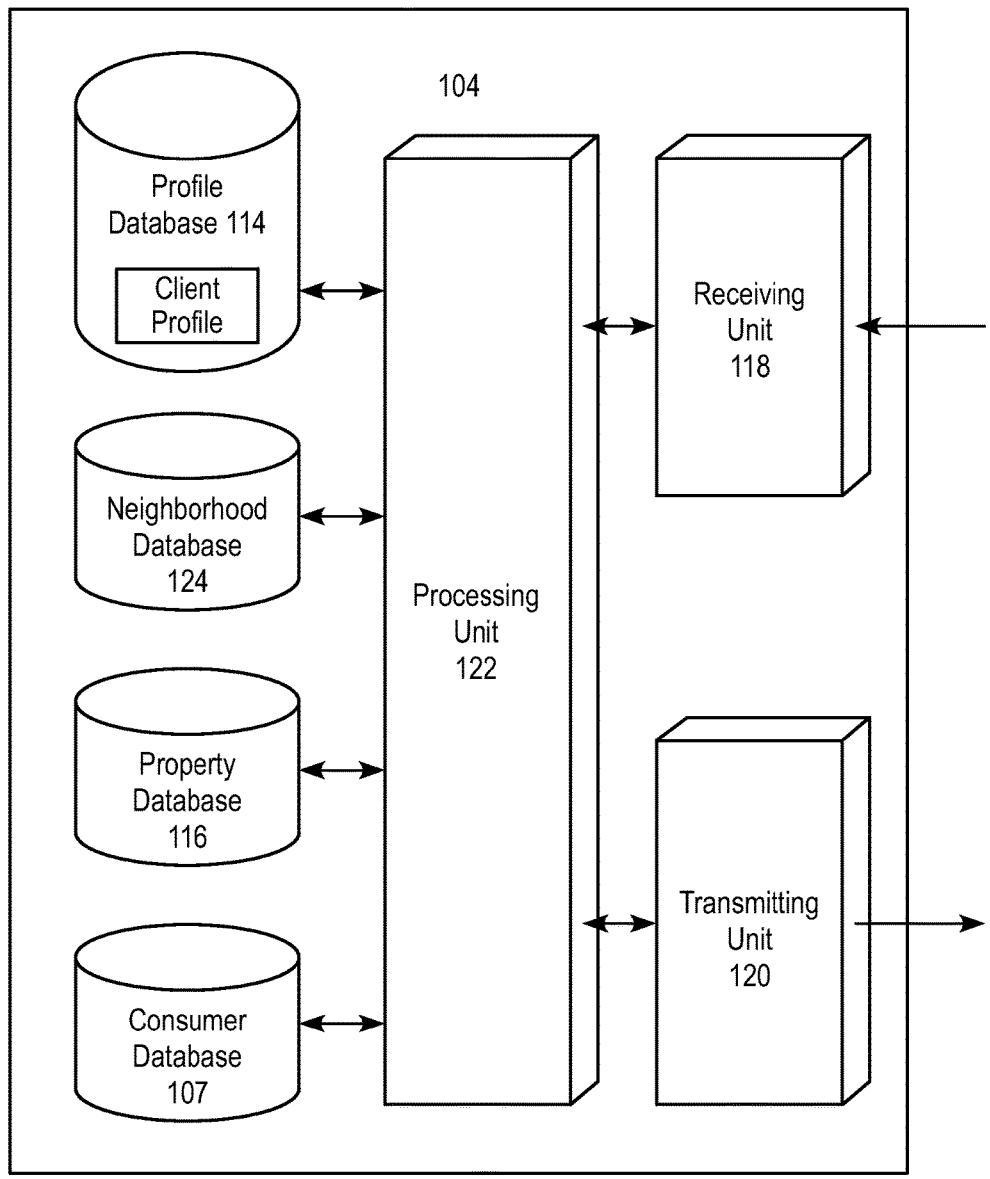
FIG. 2 is a diagram illustrating a processing server of FIG. 1 for the generation of real estate search results in accordance with exemplary embodiments.
Figure 4:
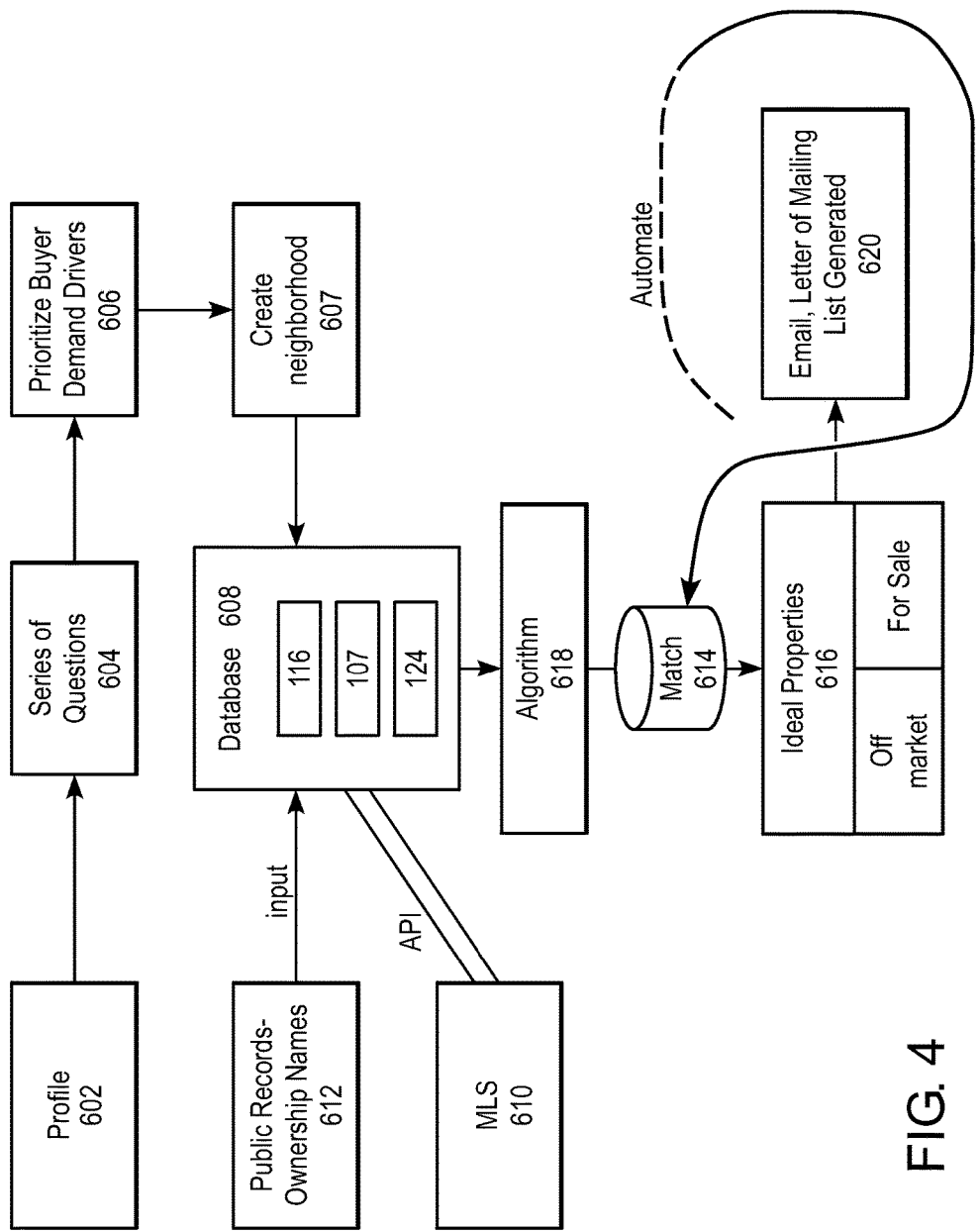
FIG. 4 is a flow diagram illustrating a process for inputting a client profile including client preferences and locating properties based thereon in accordance with exemplary embodiments.

The processing server 104 may also receive and maintain consumer information in a consumer database 107 (as shown in FIGS. 2 and 4). The consumer database 107 may include information regarding owner names, ages, sex, marital status, number of properties owned, email address, phone number, occupation, net worth, annual salary, investor type, primary residence, length of time at primary residence, family data, and any other quantifiable attribute about the consumer. The information may be aggregated from public sources, purchased from third parties, and/or collected directly from consumers. Once inputted in consumer database 107, the consumer database 107 may be matched to the property database 108 using fields such as owner name, address and/or other quantifiable information stored in both the consumer database 107 and the property database 116.

The processing server 104 may also receive registration information from the property owner 108 or other sources for storage in a property database 116 (shown in FIG. 2). The property owner registration information may include a property owner identifier and, optionally, property information including estimated or assessed value and attributes of the property including age of the property, current and previous building permit information, and the like. Moreover, the processing server 104 may transmit offers and other communications to and from the property owner 108 regarding interest in their property, which may be included in the property database 116, and may also receive property owner input regarding the sale or lease of their property using known communication protocols, such as known form filling programs, template e-mail or printed communications for conventional delivery.

The processing server 104 may also send and receive information regarding properties for sale or lease to and from a real estate database 112, such as MLS® or any other suitable real estate listing database. Moreover, the processing server 104 may send and receive information regarding all properties from a property tax records database 140. Such information from the property tax records database 140 may include property tax assessment values, previous purchase price, age of the building, relative value to adjacent properties or other buildings having similar characteristics within a given area, and the like.

In embodiments, the databases, including the property database 116, may be populated with information from GIS (geographic information systems) files, including subdivisions, neighborhood groups, access to public transportation, access to rail lines, school attendance zones, average commute times, proximity to landmarks, road access and the like.

In addition, the system 100 may include at least one administrator 132 that may monitor the system, view and search client profiles, and update neighborhood information based on changes within the neighborhood via an administrator computing device 130. The administrator 132 may communicate with the processing server 104 via the administrator computing device 130, which may be any of the devices listed above and may be a device of the same or different type than the client and property owner computing devices 106, 110.

The client computing device and the property owner computing device may include a main memory, for example, random access memory (RAM), and may also include a secondary memory. Secondary memory may include, for example, a hard disk drive, removable storage drive. Removable storage drive may comprise a floppy disk drive, a magnetic tape drive, an optical disk drive, a flash memory, or the like.

The removable storage drive reads from and/or writes to a removable storage unit in a well-known manner. Removable storage unit may comprise a floppy disk, magnetic tape, optical disk, etc. which is read by and written to by removable storage drive. As will be appreciated by persons skilled in the relevant art, removable storage unit includes a non-transitory computer usable storage medium having stored therein computer software and/or data.

Processing Server

FIG. 2 is an illustration of the processing server 104 of the system 100 (shown in FIG. 1). The processing server 104 of FIG. 2 is an illustration only and may not be exhaustive of all possible configurations of the processing server 104.

The processing server 104 may include a receiving unit 118 configured to receive data over one or more networks via one or more protocols. The receiving unit 118 may receive registration information from one or more of the client device 106 or from the property owner device 110. As noted above, the registration information may include a client identifier, at least two preferences, and a property owner identifier, and may be stored within the profile database 114 of the processing server 104.

As will be appreciated by persons skilled in the relevant art, processing server 104 may also be a single processor in a multi-core/multiprocessor system, such system operating alone, or in a cluster of computing devices operating in a cluster or server farm. Processing server 104 may be connected to a communication infrastructure, for example, a bus, message queue, network, or multi-core message-passing scheme.

The processing server 104 also includes a processing unit 122, which may identify the client device and associated preferences and match the client 102 to a property listing in a property database 116. The property database 116 may include information downloaded from a property tax records database as discussed above. The processing server may also include a neighborhood database 124 which may include a list of predetermined neighborhoods based on distance from a specific location, a subdivision or the like, but exclude neighborhoods based solely on zip code.

In other embodiments, the processing unit 122 may match client preferences of a client 102 from the profile database 114 with properties in other databases such as Multiple Listing Service Listings (MLS®) via an application programming interface (API) as discussed with reference to FIG. 1.

The processing unit 122 may generate a list of suitable real estate listings for transmission to the client device 106 via a transmitting unit 120. The list may be based on properties located in a specific neighborhood or properties having certain features. The transmitting unit 120 may be configured to transmit the list over one or more networks via one or more network protocols. The list may be sent to the client computing device 106 associated with the device identifier included in the client profile. A receiving unit 118 may receive a confirmation of transmission from the client computing device 106.

In some embodiments, the transmitting unit 120 may also send a communication to the property owner device 110 indicating interest in purchasing or leasing their property that may or may not be listed for sale, but is within the client's neighborhood of interest to solicit interest in selling the property, as discussed in more detail below. The transmitting unit 120 may also send a communication to the property owner device 110 providing offers to provide home related services and goods.

For example, as shown in FIG. 17, the client can input 1100 a search query into the system via the client computing device. The processing server that compares 1110 the search query with the databases and predicts 1120 property needs for home related goods and services. For example, the databases can include property age, building permits, and tables indicating average life span of systems, such as heating and air systems, which can be used to predict when a property owner will need a new heating and air system. The processing server then generates 1130 a list of matching properties and the transmitting unit send 1140 the list to the client computing device. The client reviews the list and inputs 1150 an offer via the client computing device. The offer is then transmitted 1160 to the property owner computing device via the transmitting unit. The property owner can review the offer 1170 via the property owner computing device and input 1180 an acceptance, a rejection or a counteroffer. The transmitting unit then sends 1190 the communication to the client.

In embodiments, the receiving unit 118 may receive an offer to buy or lease a property from the client computing device 106 and transmit the offer to the property owner computing device 110 via the transmitting unit 120. Acceptance of the offer, a counteroffer, or interest in selling the property by the property owner 108 may be received by the receiving unit 118 from the property owner computing device 110 and transmitted to the client computing device 106 via the transmitting unit 120.

Methods for transmitting the offer, the counteroffer, the acceptance, and/or the list include, without limitation, email, mail, short message service message, multimedia message service message, or via an application program executed by the computing devices 106, 110. The property owner may receive communications through any written or digital means including real time alerts to any web-enabled device.

Client Profiles

Figure 3:
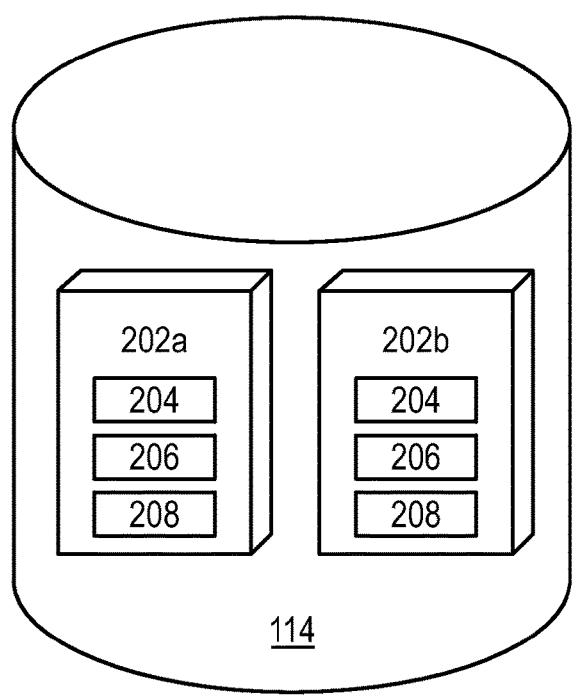
FIG. 3 is a diagram illustrating a client and property owner profile database of the processing server of FIG. 2 in accordance with exemplary embodiments.

As illustrated in FIG. 3, the profiles database 114 may store one or more client profiles 202a, 202b. Each client profile 202a, 202b may include at least a client identifier 204, a device identifier 206, and at least two client preferences 208. The client profile 202a, 202b may also include client requirements and neighborhood preferences and neighborhood requirements. The client profile 202a, 202b may be inputted via the client computing device 106.

In one embodiment, at least two client preferences 208 may be specific to a particular region. The client expresses his or her preferences in a quantifiable manner using techniques known in the art. For example, the client may be asked to indicate on a numerical scale the relative importance of a particular property attribute, which then serves to weight the preference. Thus, the client's preference for a property attribute is a quantifiable representation of what the client considers to be the importance of the factor when considering properties. A strong or heavily weighted preference may cause a property to be listed above other properties even if it lacks a weighted preferred attribute. Algorithms for making this determination will be apparent to those skilled in the art, and may be varied according to other criteria, as desirable or suitable to a given situation. For example, the client preferences 208 might include the client indicating or the algorithm predicting on a scale of 1 to 10 (10 signifying a required characteristic of a prospective property) wanting 5 bedrooms (10), at least 3000 sq. ft. of living space (8), 3½ bathrooms (7), a pool (3), etc. Only properties having 5 bedrooms would appear in the search results, and at the top of the list would be those that had at least 3000 sq. ft. of living space, and within those listings, those that had 3½ bathrooms, etc. Moreover, the client's preferences may include the client's desired property attributes and the client's desired neighborhood attributes. The client's preference for a desired property attribute is the buyer's or lessee's expression of the importance of a particular property attribute when considering a property.

The at least two preferences 208 may include preferences as to proximity to schools, shopping centers, playgrounds, hospitals, beaches, police stations, and/or fire stations. The preferences 208 may also include demographic information regarding current residents, such as income levels, education levels and the like.

At least some client requirements may be specific to a particular region. The client expresses his or her requirements in a quantifiable manner using techniques known in the art. For example, the client may be asked to indicate a particular value or a particular range for a particular property attribute. The client's requirement for a particular value or set of values for a property attribute is a quantifiable representation of what the client requires in any properties.

A client's requirement is the client's expression of a required attribute of a particular property. Determining whether the requirement is met may be based on a property attribute determined from property data and other sources. The requirement may be inclusive or exclusive. For example, the requirement may include only properties within one mile of a public transit stop, or the requirement may exclude properties within one mile of a sports venue. Accordingly, with respect to each property attribute and each neighborhood attribute, the client's input is required. A client may enter these with a variety of methods known in the art. In one embodiment, the system provides a set of guided questions where the client's input is solicited in the form of a response to the guided questions. Each client may be presented with a distinct set of guided questions. The set of guided questions may be configured in response to the client's responses to some of the previously answered guided questions or on other information already submitted by the client.

When included, the client requirements may include price range, number of bedrooms, number of bathrooms, number of rooms, empty lot, readiness for tear down, lot size, square footage, year built, year upgraded and the like.

The client identifier 204 may be a unique value associated with a particular client 102. The client identifier 204 may be used to identify a corresponding client 102 and profile 202a, 202b. The client identifier 204 may be an identification number, user name, email address, name, street address, phone number, social security number, randomly generated identification number, or any other identifying value associated with the client 102.

The device identifier 206 may be a unique value used to identify the client computing device 106 used by the client 102. The device identifier 206 may be an internet protocol address, registration number, serial number, local area network address, manufacturer number, username, or any other suitable identifier or combination thereof.

Neighborhoods

Figure 6:
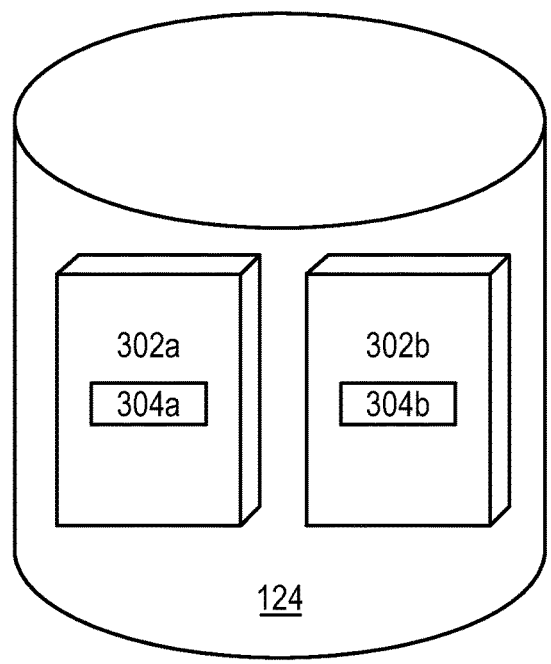
FIG. 6 is a diagram illustrating a neighborhood database of the processing server of FIG. 2 in accordance with exemplary embodiments.

As noted above, the neighborhood database 124, shown in FIGS. 3 and 6, may include one or more predefined neighborhoods 302a, 302b defined by geographic proximity to community features, including but not limited to, schools, fire stations, police stations, shopping centers, hospitals, veterinarians, parks, beaches, mountains and the like, or a client may define a neighborhood for inclusion in the neighborhood database 124. The neighborhoods 302a, 302b included in the neighborhood database 124 are defined by attributes other than zip code.

Preferably, each of the neighborhoods 302a, 302b in the neighborhood database 124 includes economic data regarding the neighborhood that may be transmitted to the client along with any lists generated by the methods and systems described herein. The neighborhood data may need to be determined from the attributes of the individual properties. For instance, if a neighborhood in the database 124 includes 40% of properties from one statistical economic zone and 60% of properties from an adjacent economic zone, the defined neighborhood would display economic data weighted 60/40 from the predefined economic statistical zones. The economic data may include median list price, average list price, asking price per square foot, average days on the market, inventory of properties, most expensive listing, least expensive listing, percent of properties with price decrease, percent of properties relisted, percent of properties flipped, median house size, median lot size, median number of bedrooms, and median number of bathrooms. The client may access this data and use the data to determine what price to offer a property owner, and potentially to learn more about the demographics of the neighborhood.

Moreover, the processing unit 122 could provide a market analysis and/or market forecast based on the available economic data for a specified neighborhood and/or individual properties therein. The economic data may include home sales figures, house price appreciation, household formation data, home ownership rates, housing affordability, market inventory, speculative building index, inventories to sales ratios, median days on the market, builders' cost index, mortgage originations (purchases and refinances), ARM share of overall mortgages, cash-out refinancing activities, mortgage loan to value ratio, Federal Reserve survey of banks' lending practices, mortgage delinquency rates, building permit information, patterns of growth (past, present, and future), dollar per square foot, dollar per square foot per number of bedrooms, dollar per square foot per building quality, dollar per square foot per building effective age, number of days on the market per number of bedrooms, number of days on the market based on building quality, number of days on the market based on building effective age, comparisons between submarkets and comparisons between submarkets over a period of years or months.

Figure 10:
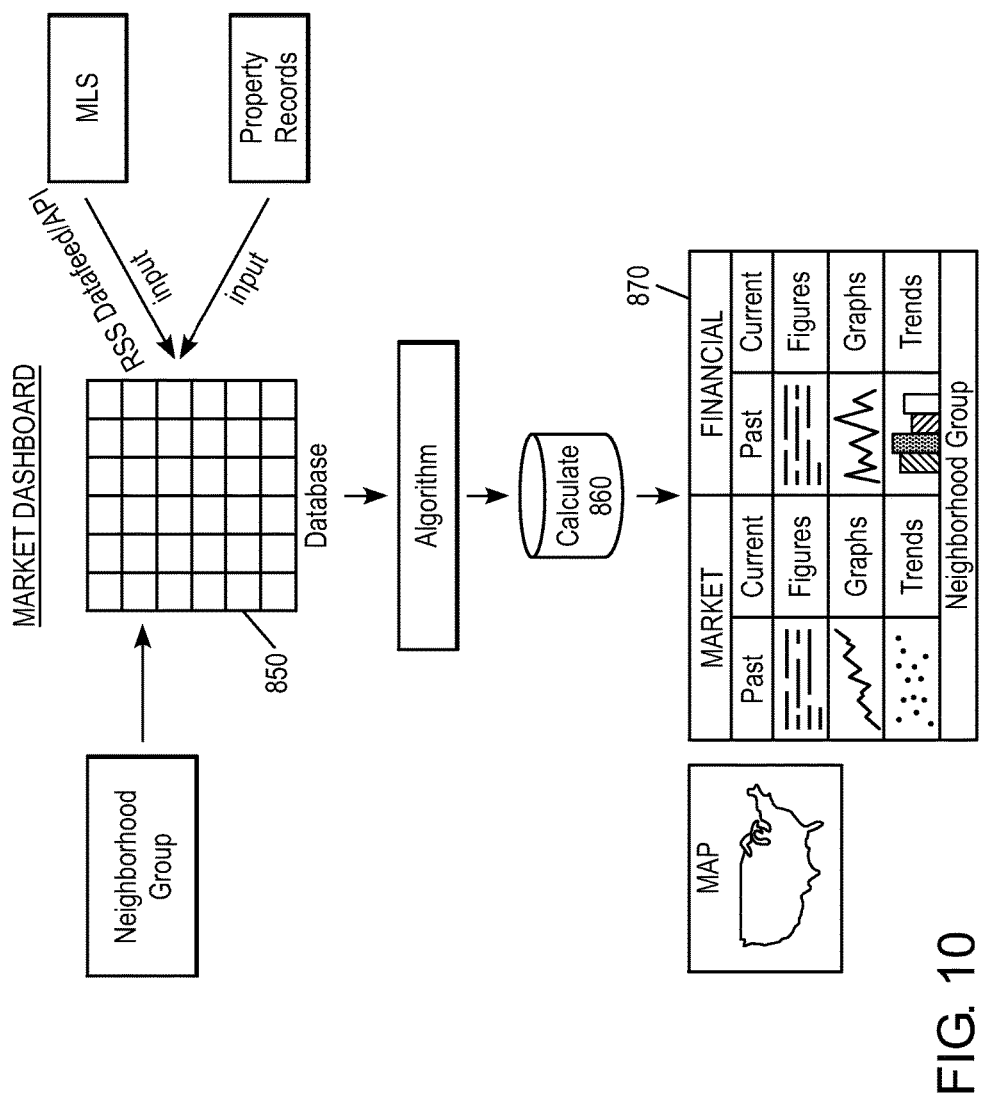
FIG. 10 is a flow diagram illustrating an automated process for market analysis.

As shown in FIG. 10, the processing unit 122 can review the economic data for a neighborhood that is stored 850 in the database (property database, 116, profile database 114, consumer database 107, neighborhood database 124) and calculate 860 past, present and future trends of the market based on the information stored in the databases. The processing unit 122 could generate 870 a report including figures and graphs that show the trends of the neighborhood to provide additional information regarding a selected neighborhood. For example, the processing unit 122 may review sales prices over the course of a year or more and calculate possible future price trends.

Properties

Figure 7:
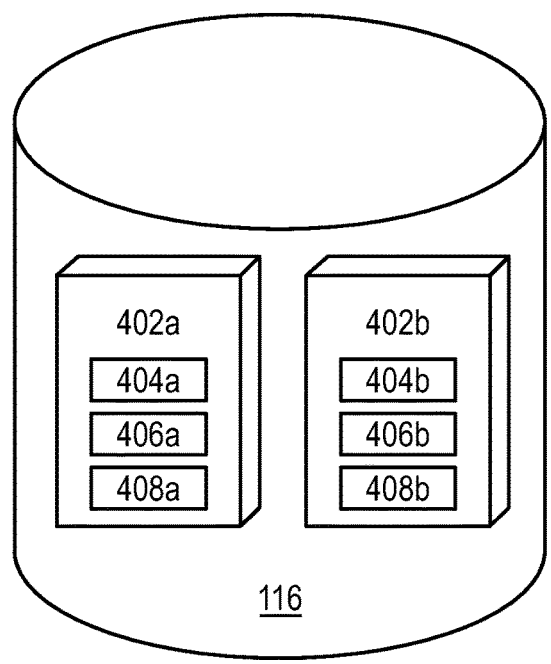
FIG. 7 is a diagram illustrating a property database of the processing server of FIG. 2 in accordance with exemplary embodiments.

As shown in FIG. 7, the processing server may include the properties database 116. The properties database may include one or more properties 402a, 402b. Each of the properties 402a, 402b may include a tax assessment value 404a, 404b and property statistics 406a, 406b. Optionally, the properties 402a, 402b may include listing price if the property is for sale.

In one embodiment, the properties database 116 may also include current zoning data and zoning laws 408a, 408b relevant to each property included in the properties database 116. During a search, an algorithm could match a client identifier with all properties meeting the required zoning criteria as inputted by the client computing device 106. For example, the client 102 could input specific details of their real estate project via the client computing device 106. The details could include the type of property (e.g., mid-rise apartment building), square footage and location relative to public transportation. The processing unit 122 could then locate all properties in the properties database 116 zoned for a mid-rise apartment building of the desired size.

Process for Generating a List of Properties Having the Desired Property Attributes FIG. 4 illustrates a process for the generation of a list of properties. In one embodiment, the properties may have one or more of a client's property preferences, property requirements and/or neighborhood requirements. In other embodiments, the list of properties may include all properties located in a neighborhood and the list may be narrowed thereafter by the client.

In step 602, a client profile is created by the client 102 via the client computing device 106, if desired. The client profile may include a client identifier and/or a computing device identifier as discussed above.

In step 604, the client computing device 106 optionally inputs answers to a series of questions regarding various property preferences and/or property requirements.

In step 606, the client computing device 106 may weight the property preferences and/or property requirements of the client 102 based on how important each preference or requirement is to the client 102 through input of a client selected weight on the client computing device 106. For example, the property preferences may be weighted (adstraction) on a scale of 1 to 10, with 1 being least important and 10 being most important to the client 102 through input of a client selected weight on the client computing device 106. In step 404, the client 102 selects property requirements, which as discussed above, are features that the property must include. The property attributes and the property requirements are saved in the client profile in the client database in step 604. In addition, the system may also prioritize or weight the client attributes based on regional demographics or past client preferences. The weighted information is stored in the database.

In step 607, the client 102 inputs into the client computing device 106 answers to a series of questions regarding preferred neighborhood attributes and neighborhood requirements. The neighborhood attributes and requirements may be weighted by numerical ranking, for example. In addition, the client 102 may draw boundaries on a map indicating desired geographical location.

The processing unit 122 may also weight the property preferences and the property requirements according to the geographical region and/or other demographics. The processing unit 122 then compares the weighted property preferences and property requirements with the client's own weighted property preferences and requirements as saved in the client profile.

In step 608, the processing server 104 establishes a database. The database may include a property database 116 and a consumer database 107 (shown in FIG. 2). The property database 116 may include property information regarding properties for sale and/or for which the property owner has not expressed an interest in selling. The property information may be downloaded in step 610 via an application programming interface (API) or FTP of a third party data provider. Alternatively, data may be downloaded or an RSS data feed may be used. The database also connect to a public records system, such as a tax records database, in step 612 to obtain ownership records and title information of properties included in the property listings.

The database may also include a neighborhood database 124 (shown in FIG. 2) which may include a list of neighborhoods selected in step 607 along with economic data and optionally market analysis associated with each neighborhood as discussed above.

In step 618, the client preferences, client requirements, neighborhood preferences, and neighborhood requirements, if selected, are compared to the property listings, matches are made 614, and a list of potential matches and near matches is generated at step 616. The processing unit 122 may match properties within a top rated neighborhood or a neighborhood chosen by the client with the client's property preferences and property requirements to find properties most closely matching those preferences and requirements.

In step 614, the processing unit 122 generates a list of properties 616, which most closely match the client's property attributes and property requirements as weighted by both the client through selection of a weighting factor in the client computing device 106 and by the processing unit. Alternatively, the list may include all properties in the chosen neighborhood. The list may be broken down by the properties that are currently for sale and those not currently for sale. The list may be sorted by degree of match, and may include a graphical indication of the degree of match, or mismatch, either collectively or by each identified attribute. The list may also include an analysis of the neighborhood including economic and demographic data, particularly in situations where the list includes properties in more than one neighborhood. The economic data may be used to establish a market value range for the properties.

If desired, the client device 106 may be used to narrow the list by selecting properties based on architectural features and visual analysis. Such evaluations may be saved in the client profile database 104, neighborhood database 124, consumer database 107, and/or property database 116, as appropriate, and to improve future lists automatically or display as ancillary comments, with or without attribution, perhaps as aggregated data.

Optionally, the system may also provide a valuation of the one or more properties on the list based on the economic data saved in the database and comparable sales in the neighborhood. In one embodiment, the last x number of sales may be identified, and the % difference between the assessed value of each of the last x sales and the sale value of each of the last x sales may be found. Then, the resulting percent difference may be applied to any list price to determine an optimum offer price range for a given property.

Figure 8:
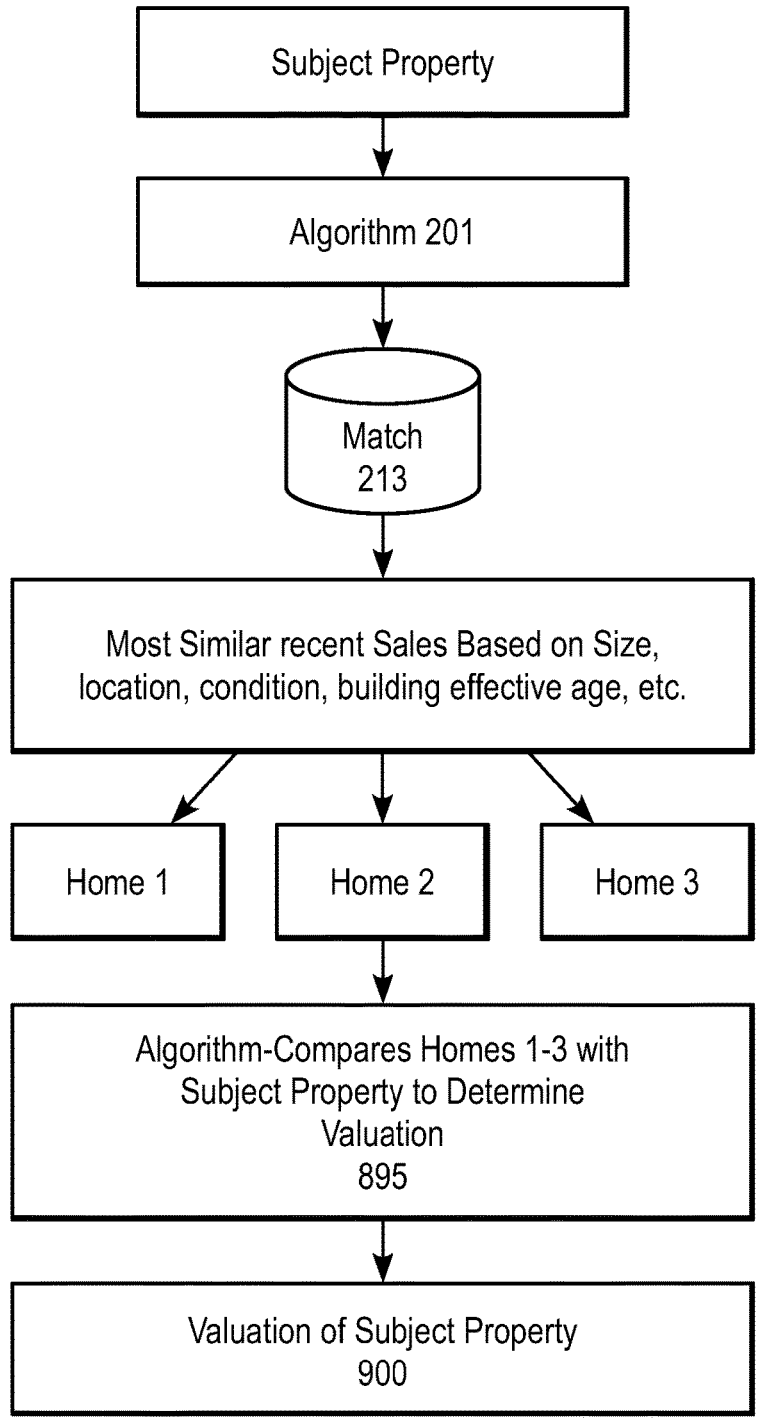
FIG. 8 is a flow diagram illustrating a sales comparison approach to valuating a property.
Figure 9:
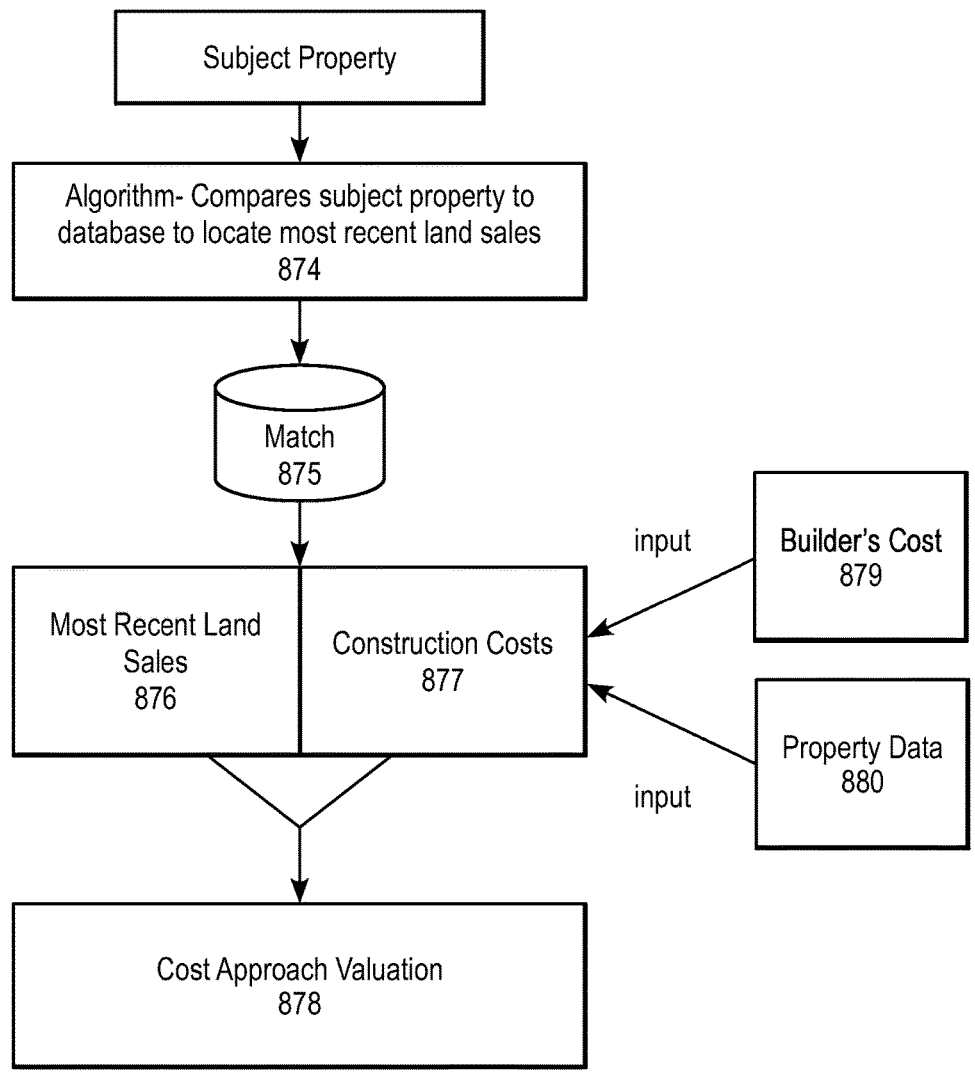
FIG. 9 is a flow diagram illustrating a cost approach to valuating a property.

The valuation may be based on a sales comparison approach as shown in FIG. 8 or a replacement cost approach as shown in FIG. 9. As shown in FIG. 8, when using the sales comparison approach, the processing unit 122 may run an algorithm 201 to compare and match 213 a property to three or more similar properties in the property database that have sold within the previous six months. The similar properties may be selected based on location, building quality, building effective age and location and the similar properties may be included in the properties database 116. The processing unit 122 will automatically compare 895 the property with the similar properties to generate a valuation 900. For example, the processing unit 122 may compare a subject property with electronic information stored in the properties database to locate three or more similar properties having similar features.

As shown in FIG. 9, the processing unit 122 may use a sales comparison approach to valuation in addition to or in lieu of the sales approach. In the sales comparison approach, the processing unit 122 compares the subject property to the property databases to locate most recent land sales 874. The processing unit 122 then matches 875 a property to the most recent land sales 876 within a specific submarket. Then, the cost of replacement of a building is estimated 878 by comparing the property to a builders' cost 877 to construct an identical new property. The builders' cost may be based on the size of the building, the number of bedrooms, the number of bathrooms, and the quality of the finishes. The builders' cost information 879 and/or property data 880 may also be stored in the property database 116 or inputted directly by builders.

Also optionally, the system may narrow the search based on final use of the property. For example, the client computing device 106 may input details of a desired building project including square footage and zoning requirements. The system may then narrow the results based on those criteria.

Figure 11:
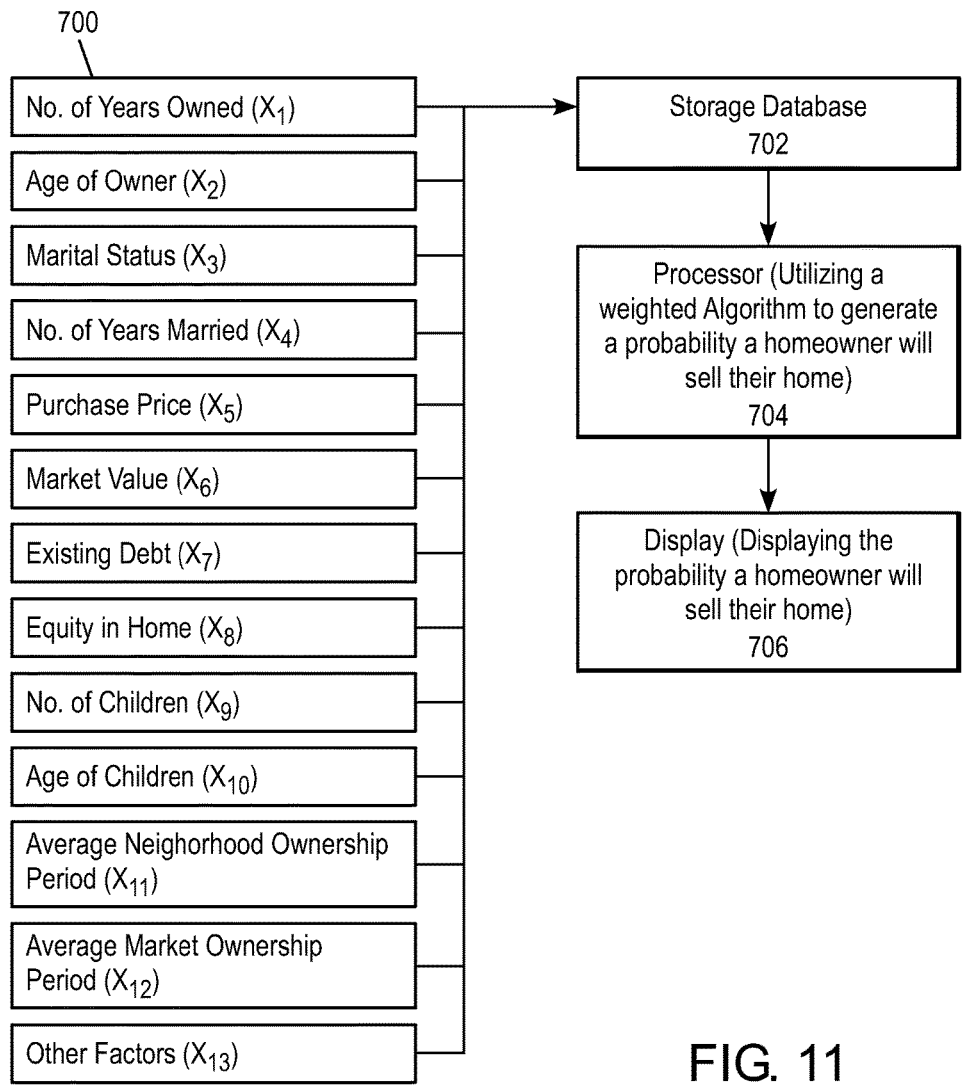
FIG. 11 is a flow diagram illustrating an automated process for determining probability of a homeowner selling their home.

In one embodiment, the system may also determine an indicator of likelihood that a homeowner would sell their home as shown in FIG. 11. The above determination may be made based on a number of factors 700. By way of example, the following non-exhaustive list of factors may be used to determine the likelihood: number of years the house has been owned ($X_1$); the age of the owner ($X_2$); marital status ($X_3$); number of years married ($X_4$); the purchase price of the home ($X_5$); the market value of the home ($X_6$); any existing debt on the home ($X_7$); any equity in the home ($X_8$); number of children in the household ($X_9$); the ages of any children in the household ($X_{10}$); average period of ownership within the neighborhood ($X_{11}$); and/or average period of ownership within the market ($X_{12}$). One or all or some combination of the factors listed above may be used to determine the likelihood that a homeowner would sell their home. A person possessing ordinary skill in the art would appreciate that any number of suitable factors not listed above may be used to make the determination of the likelihood that a homeowner would sell their home. The factors may be stored in a storage database 702.

The system may further assign weights to the various factors used to determine the likelihood that a homeowner would sell their home. For instance, the system may assign a numerical value between 0 and 100 to each of the factors used to make the determination of the likelihood that a homeowner would sell their home. These weighting factors may be statistically derived, e.g., by looking at historical statistics on those who sell or buy and those who do not or by looking at actuarial tables. The processor may execute an algorithm 704 to calculate the likelihood that a homeowner would sell their home based on the weighted factors and display the result on a display system 706. For example, the processor may add the various weighted factors and output the numerical score as the likelihood that a homeowner would sell their home. For example, the likelihood of selling, for instance, could be measured as a number, for instance as follows: $S=\Sigma_{1-n}a_1*X_1+a_2*X_2+a_3*X_3 \ldots +a_n*X_n$. Other algorithms based on predictive analysis techniques for making this determination will be apparent to those skilled in the art, and may be varied according to other criteria, as desirable or suitable to a given situation.

Figure 13:
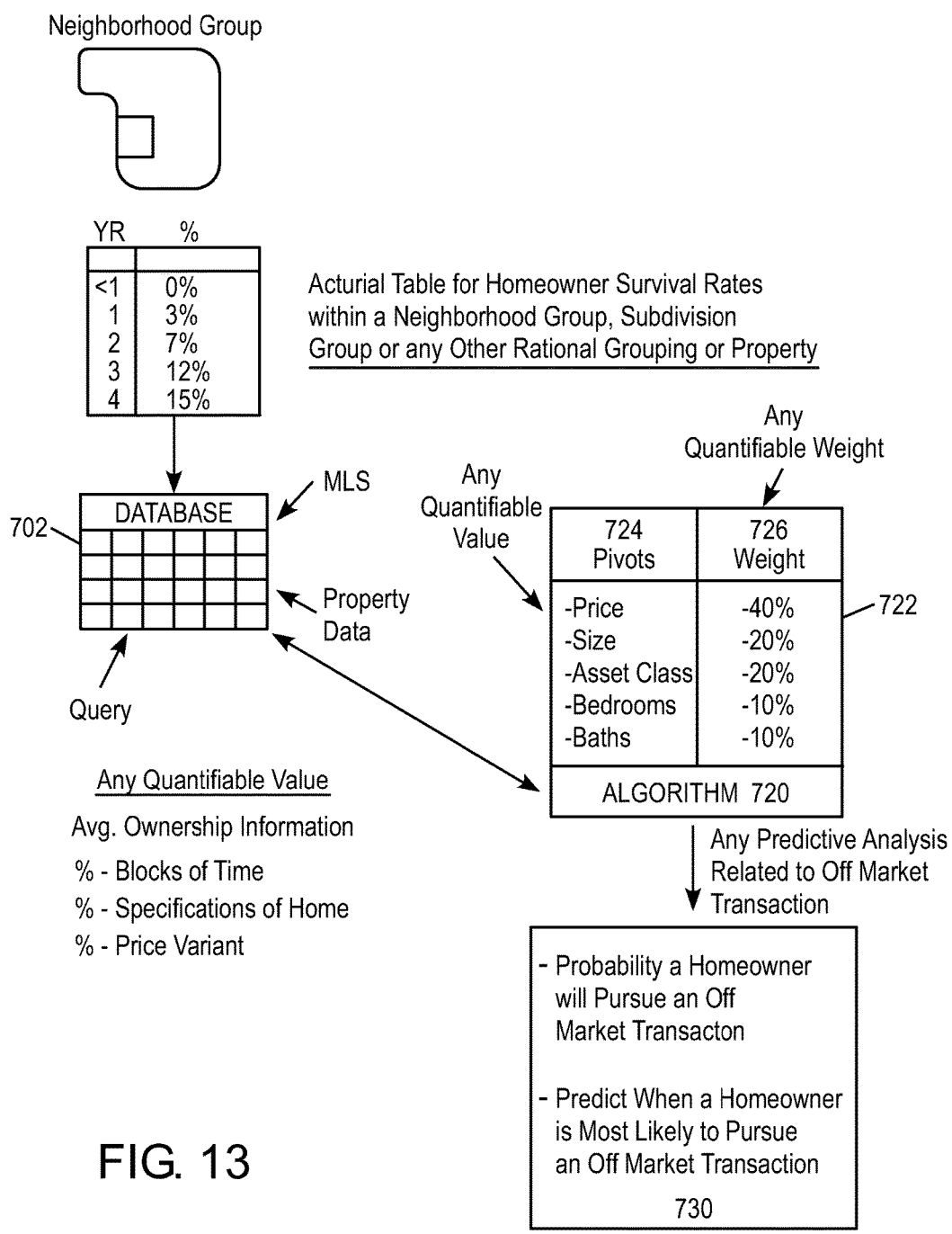
FIG. 13 is a flow diagram illustrating an automated process for market analysis.
Figure 16D:
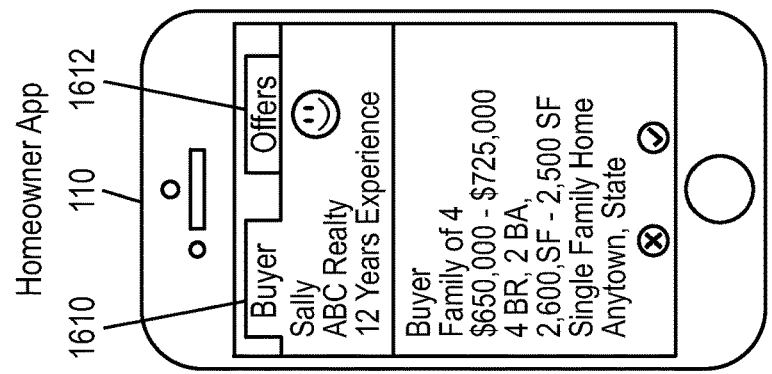
Figure 16C:
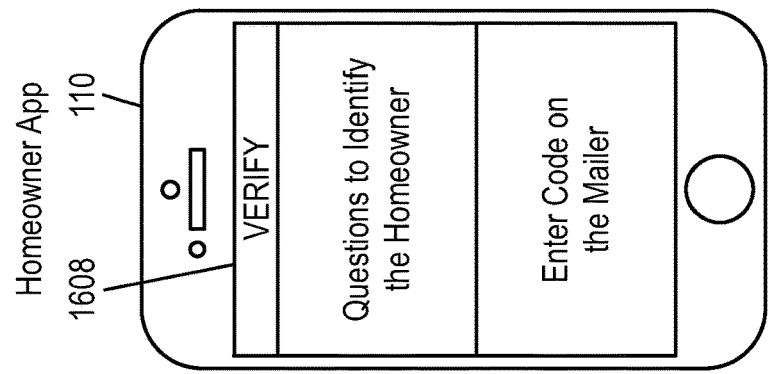
Figure 16B:
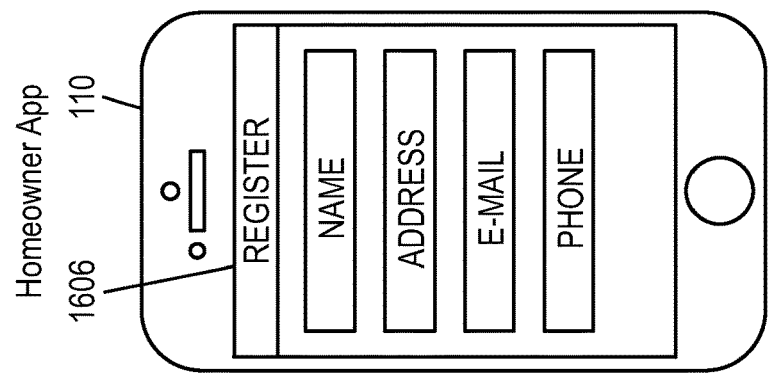
Figure 16A:
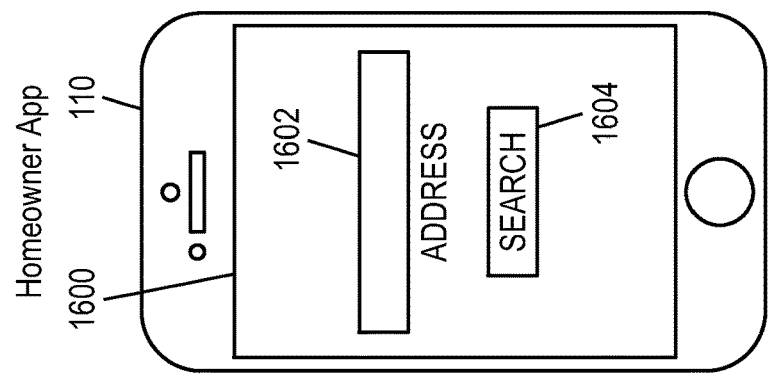

For example, as shown in FIG. 13, the administrator or client may input the various factors 724 and their respective weights 726 in the system. The processor may compare 720 the inputted factors 724 and weights 726 with information electronically stored in the database 702, which may include any quantifiable value including average ownership information, percent blocks of time, percent specifications of home and percent price variant. The database 702 may also include actuarial tables including homeowner survival rates within a neighborhood group, subdivision group, or any other rational grouping of properties, information from the MLS®, and other property data. The factors 724 and weights 726 may be used to generate 730 a numerical score that indicates possible outcomes including the likelihood that a homeowner would sell their home and when a homeowner is most likely to pursue an off market transaction.

Figure 12:
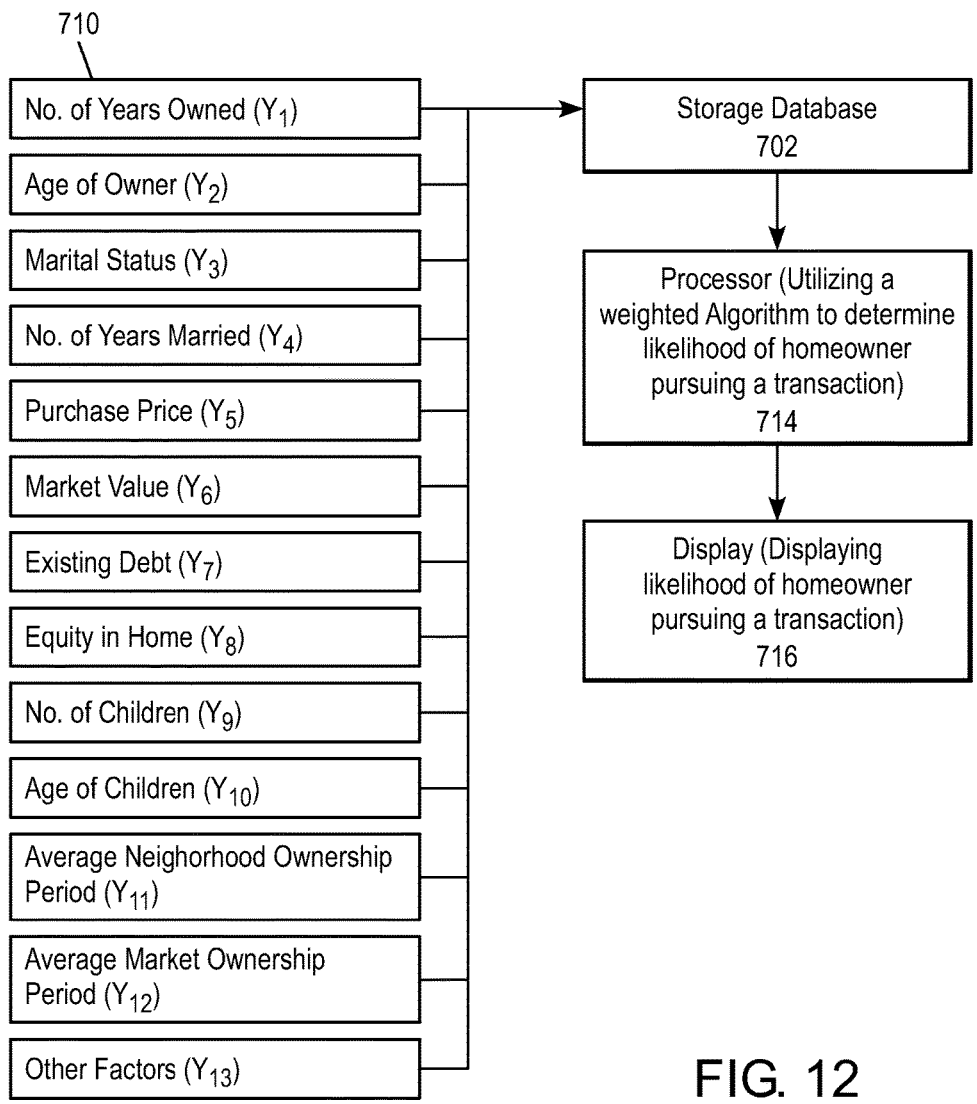
FIG. 12 is a flow diagram illustrating an automated process for determining likelihood of homeowner pursuing a transaction.

In still another embodiment, the system may also determine a probability that the homeowner would pursue a transaction as shown in FIG. 12. The above determination may be made based on a number of factors 710 that may be stored in a storage database 612. By way of example, the following non-exhaustive list of factors may be used to determine the likelihood: number of years the house has been owned ($Y_1$); the age of the owner ($Y_2$); marital status ($Y_3$); number of years married ($Y_4$); the purchase price of the home ($Y_5$); the market value of the home ($Y_6$); any existing debt on the home ($Y_7$); any equity in the home ($Y_8$); number of children in the household ($Y_9$); the ages of any children in the household ($Y_{10}$); average period of ownership within the neighborhood ($Y_{11}$); and/or average period of ownership within the market ($Y_{12}$). One or all or some combination of the factors listed above may be used to determine the probability that the homeowner would pursue a transaction, and use equations similar if not the same as used for determining a propensity to sell. A person possessing ordinary skill in the art would appreciate that any number of suitable factors not listed above may be used to make the determination of the probability that the homeowner would pursue a transaction. The system may further assign weights to the various factors used to determine the probability that the homeowner would pursue a transaction. For instance, the system may assign a numerical value between 0 and 100 to each of the factors used to make the determination of the probability that the homeowner would pursue a transaction. The processor may execute an algorithm 714 to calculate the probability that the homeowner would pursue a transaction based on the weighted factors and display the result on a display system 716. For example, the processor may add the various weighted factors and output the numerical score as the probability that the homeowner would pursue a transaction, such as identified in the preceding paragraphs. Algorithms for making this determination will be apparent to those skilled in the art, and may be varied according to other criteria, as desirable or suitable to a given situation. In still another embodiment, the administrator may input the various factors and their respective weights in the system to generate the probability that the homeowner would pursue a transaction.

The above analysis may be applied to neighborhood groups, subdivision groups, or any other rational groupings of properties. All property data may be stored in the database, which sources information from the MLS® as well as property records. The database may include and/or reference actuarial tables for homeowner survival rates within a neighborhood group, subdivision group, or any other rational grouping of property. The processor implementing the algorithm may query the database regarding any quantifiable property attribute (e.g. Price, Size of Property, Number of Bedrooms, Year the property was built). Specifically, the processor implementing the algorithm may query information related to blocks of time, specifications of homes, and price variants. Averages within a defined market may be calculated based on the above information and applied to individual properties.

The processor may use baseline probabilities based on property specifications, or any other quantifiable value. These pivots include price, property size, asset class, number of bedrooms, number of bathrooms, or any other quantifiable value. Various weights may be applied to each of the attributes and the weight may be adjusted to improve the accuracy of the predictive analysis.

The processor thus predicts the probability that a homeowner will pursue an off-market transaction, predicts when a homeowner is most likely to pursue an off-market transaction, and predicts any outcome related to the sale of a home without marketing properties on the MLS®. This predictive analysis includes "private-exclusive" listings.

In step 620, the client 102 may select the preferred properties via the client computing device 106 and the system will automatically generate communications to send to the property owner of each property whether or not the property is currently listed for sale. If desired, step 620 may require the client to upgrade their service by paying a fee to include this feature.

Process for Generating an Offer on a Selected Property

Figure 5:
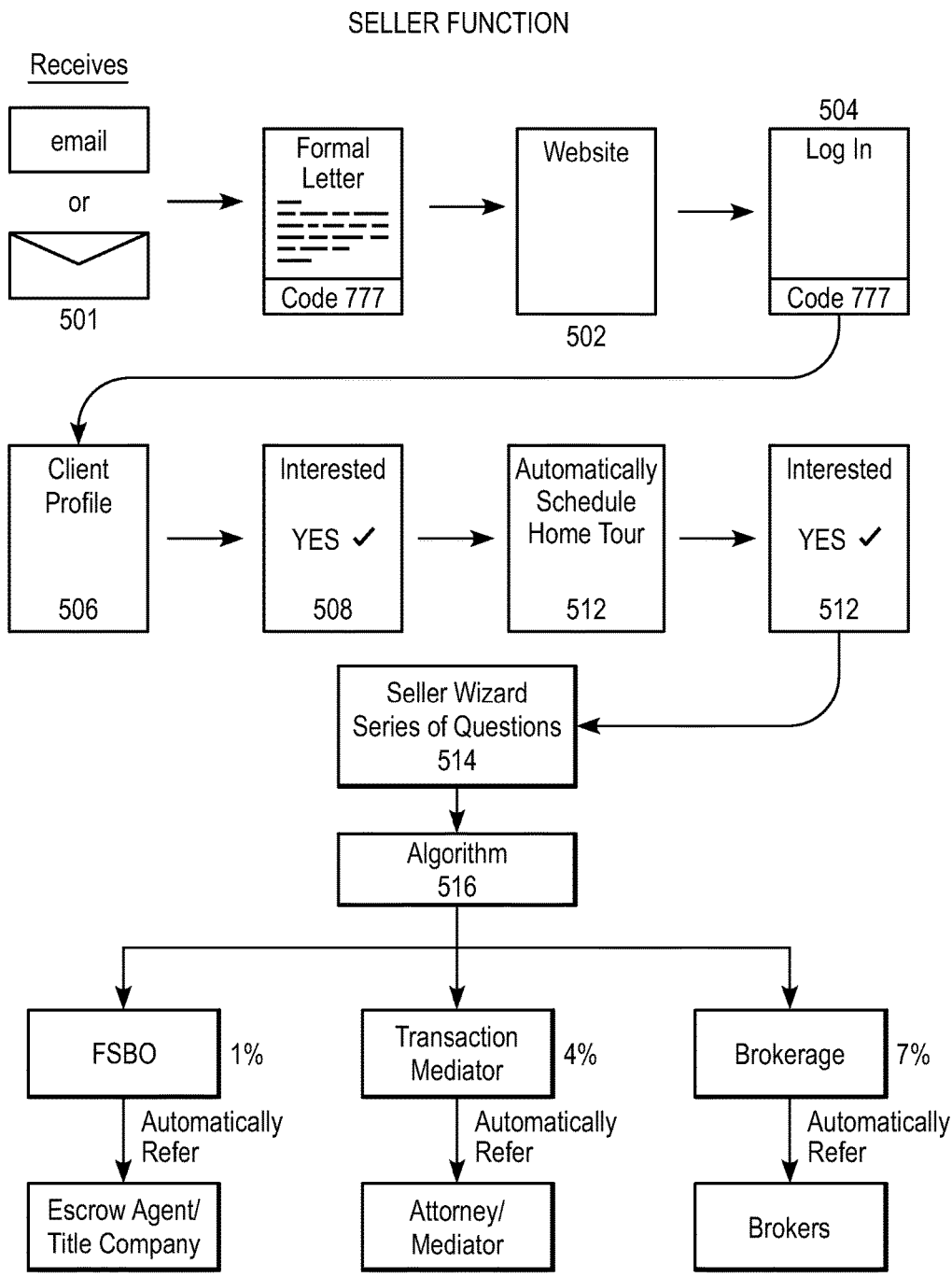
FIG. 5 is a flow diagram illustrating an automated process for interacting with a client and negotiating an offer to buy real estate in accordance with exemplary embodiments.

FIG. 5 illustrates a process for generating an offer on one or more properties included in the list generated in FIG. 4.

In step 501, a communication is sent to at least one property owner of one or more of the properties on the list generated above. The communication may be an email or other communication, and the communication may include contact information and website login information, including a code, and an indication that the client 102 is interested in purchasing the property owner's property whether or not the property is currently for sale. Once a client indicates interest, any information may be transferred via an web-enable device including, but not limited to, price range, time frame, commission rate, financing, credit score, or any other quantifiable metric.

In step 502, the property owner 108 may use the property owner computing device 110 to visit the website if desired to explore the offer and input a counteroffer if desired. In step 504, the property owner 108 may log in and create a property owner profile via the property owner computing device 110 as discussed above. The property owner 108 may then view at least some of the client profile in step 506 to determine whether their property meets the client's requirements and/or preferences and whether the client is interested, willing and able to buy or lease property at the desired price point.

In step 508, the property owner 108 may indicate whether or not they are interested in selling their property. If so, in step 510, the system may propose a home tour schedule. In step 512, the property owner may indicate, via the property owner computing device 110, if they are willing to agree to the home tour or demo the product or service. Other steps toward a closing may be automated, including prompting for other meetings, and initiating the contracting and closing process by providing suitable contract forms and contact information to title companies, closing services, mortgage companies, etc.

In step 514, the property owner may answer a series of questions via inputs into the property owner computing device 110 regarding their property including listing price, number of bedrooms and bathrooms, recent upgrades, recent appraisals, current mortgage balances, information about flooring, roof, appliances, and the yard, and the like.

In step 516, the system may compare the property owner's answers to known economic data in the neighborhood, which may be stored in the neighborhood database, to generate a suggested list price. The system then provides three options for selling the property including 1) for sale by owner, 2) via a transaction mediator and 3) via a brokerage firm. Along with each option, the cost associated therewith is provided to the property owner and a referral to a suggested title company, agent, mediator or brokerage firm is provided.

Once matched, a client may submit a non-binding offer directly to the property owner and vice versa. If the receiving party accepts the terms, both the client and the property owner are referred to a third part with the legal authority to execute a contract. The legal authority may be an licensed professional with the ability to negotiate a real estate contract including lawyers, real estate agents, mediators, or a software program.

Mobile Application

As noted above and shown in FIG. 14, the computing device 106 of the client 102 and/or the computing device 110 of the owner 108 may be a smart phone or any other web-enabled device, such as a tablet computer, which may include an app configured to access data in real time including property data 800, consumer data 802 and/or buyer data 804. Information accessible via the app may include market data, property values, new listings, new residents, interested clients, client information, level of client interest, offers, term sheets, vendor information (including agent information), local refinance rates, local rental rates, interested tenants, potential monthly saving achieved by refinance, access to vendors, vendor reviews and/or any other quantifiable data. Users, including clients and owners, may communicate with other homeowners, interested buyers/sellers, potential tenants/lessors, agents, vendors, and/or system administrators via the app. Users may also access real time information including when new listings affecting the property value of their property are listed, when other properties are sold that affect their property value, when a buyer is interested in purchasing their property, when a tenant is interested in leasing their property, term sheets, non-binding offers for purchase, rental offers, qualified offers, and/or any other communication that impacts market, property or users.

As shown in FIGS. 15A, 15B, and 15C, the app can be used on a computing device, such as an iPhone. As shown, the app can include a display 1502 that includes a search function 1510, and search criteria 1506 that the client can weight using a slider bar 1508. The app then searches properties based on the search criteria 1506 and the weights inputted for each search criteria 1506. As shown in FIG. 15B, the app can also include tabs 1512 to toggle between screens of the app. For example, one screen can include a list of properties 1514. As shown in FIG. 15C, the app can include a display 1502 that shows images of a selected property 1516 and sales data 1518 related to that property. In addition, the app can provide owner contact information 1520 and/or can generate a communication to the owner.

As shown in FIGS. 16A, 16B, 16C, and 16D, the app can be installed on a property owner computing device and can include a property owner display 1600 into which a property owner can input an address or other search criteria 1602 and search 1604 for a property. The property owner can also input registration information 1606 into the system, and can verify property owner identity 1608 by answering questions and/or entering a code. The app can include tabs 1610, 1612 to toggle between screens of the app. The screen 1610 can include a list of clients and the screen 1612 can include a list of offers.

Techniques consistent with the present disclosure provide, among other features, systems and methods for the processing of discounts for off-market transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for locating real estate having desired attributes comprising:

storing, in a profile database of a processing server, at least one client profile, the client profile being specific to a particular region and including a client identifier, at least two regional preferences with weighting input from a client computing device, at least one client requirement, at least one neighborhood preference with weighing input from the client computing device, and at least one neighborhood requirement;

identifying, by a processing unit of the processing server, neighborhood data for the particular region comprising economic data and a plurality of attributes for a plurality of properties which are not listed for sale;

storing, in a neighborhood database of the processing server, at least one neighborhood from the neighborhood data defined by at least one neighborhood attribute other than zip code;

receiving, by a receiving unit of the processing server, the plurality of properties which are not listed for sale within the at least one neighborhood;

determining, by the processing unit of the processing server, a likelihood of each of the plurality of properties which are not listed for sale is to be sold; and generating, by the processing unit of the processing server, a list of one or more properties not currently for sale within the at least one neighborhood in an order based on weighing 1) the regional preferences input from the client computing device, 2) the likelihood of the plurality of properties which are not listed for sale are to be sold, 3) client preferences and requirements, and 4) neighborhood preferences and requirements; and transmitting, by a transmitting unit of the processing server, the list of one or more properties not currently for sale within the at least one neighborhood to the client, the list presenting properties in the order;

wherein the weighting of the at least two regional preferences from the client computing device comprises receiving answers to a series of questions regarding preferred neighborhood attributes and requirements from the client computing device;

wherein the weighing input for the at least two regional preferences is further based at least partially on prior weighing input regarding the at least two regional preferences; and wherein the weighing input for the at least one neighborhood preference is further based at least partially on prior weighing input regarding the at least one neighborhood preference.

2. The method of claim 1, further including generating, by the processing unit, a valuation of each of the one or more properties not currently for sale included in the list.

3. The method of claim 1, further comprising storing, in a property database, the plurality of properties which are not listed for sale.

4. The method of claim 1, further including transmitting, by the transmitting unit, an offer to buy one of the plurality of properties which are not listed for sale to at least one property owner.

5. The method of claim 4, further including receiving, by the receiving unit, acceptance of the offer from the at least one property owner.

6. The method of claim 1, further including providing, by the transmitting unit, economic data including average list price, average days on the market, median house size and median lot size for the at least one neighborhood to the client.

7. A system for facilitating an off-market transaction, comprising:
   at least one processor;
   a profile database configured to store at least one client profile, the client profile being specific to a particular region and including a client identifier associated with a client, at least two regional preferences with weighting input from a client computing device, at least one client requirement, at least one neighborhood preference with weighing input from the client computing device, and at least one neighborhood requirement;
   a neighborhood database configured to store at least one neighborhood from neighborhood data for the particular region defined by at least one neighborhood attribute other than zip code;
   a receiving unit configured to receive listings of a plurality of properties which are not listed for sale within the neighborhood;
   a processing unit configured to:
      identify the neighborhood data comprising economic data and a plurality of attributes for the plurality of properties which are not listed for sale,
      determine a likelihood of each of the plurality of properties which are not listed for sale is to be sold, and
      generate a list of one or more properties not currently for sale within the neighborhood in an order based on weighing 1) the regional preferences input from the client computing device, 2) the likelihood of the plurality of properties which are not listed for sale are to be sold, 3) client preferences and requirements, 4) neighborhood preferences and requirements; and
   a transmitting unit configured to transmit the list of one or more properties not currently for sale within the at least one neighborhood to a client associated with the client profile, the list presenting properties in the order;
   wherein the weighting of the at least two regional preferences from the client computing device comprises receiving answers to a series of questions regarding preferred neighborhood attributes and requirements from the client computing device;
   wherein the weighing input for the at least two regional preferences is further based at least partially on prior weighing input regarding the at least two regional preferences; and
   wherein the weighing input for the at least one neighborhood preference is further based at least partially on prior weighing input regarding the at least one neighborhood preference.

8. The system of claim 7, wherein the processing unit is configured to generate a valuation of the plurality of properties which are not listed for sale.

9. The system of claim 7, further comprising a property database configured to store listings of the plurality of properties which are not listed for sale.

10. The system of claim 7, wherein the transmitting unit is configured to transmit an offer to buy at least one of the plurality of properties which are not listed for sale from the client to at least one property owner.

11. The system of claim 10, wherein the receiving unit is configured to receive an acceptance of the offer from the at least one property owner.

12. The system of claim 7, wherein the transmitting unit is configured to provide economic data including average list price, average days on the market, median house size and median lot size for the at least one neighborhood to the client.

13. The system of claim 10, wherein the transmitting unit is configured to transmit the client profile to the at least one property owner.

* * * * *